Oct. 2, 1928.
G. P. TREGO
1,686,400
WINDSHIELD WIPER
Filed Nov. 8, 1927
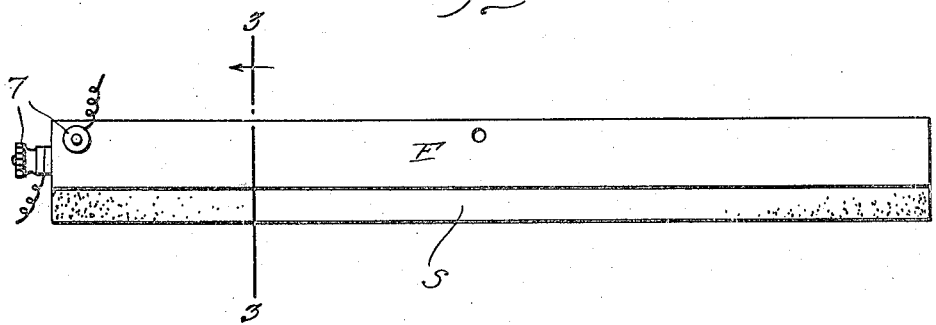
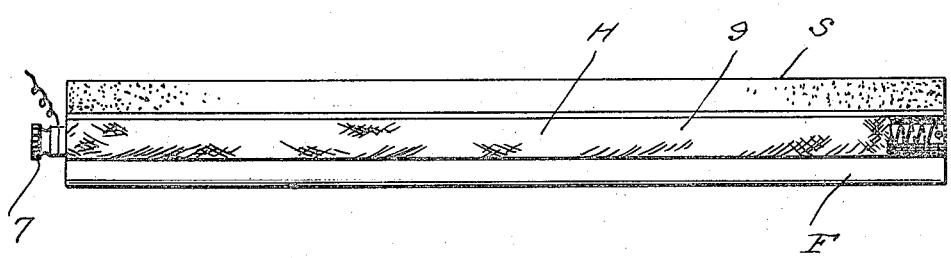
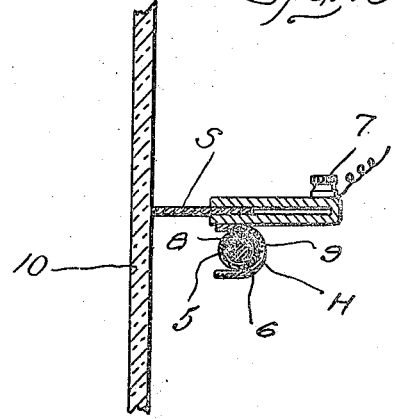
Inventor
Glenn P. Trego
By Clarence A. O'Brien
Attorney Patented Oct. 2, 1928.

1,686,400

UNITED STATES PATENT OFFICE.

GLENN P. TREGO, OF MEXICO, PENNSYLVANIA.

WINDSHIELD WIPER.

Application filed November 8, 1927. Serial No. 231,941.

The present invention relates to a windshield wiper and more particularly to the blades thereof.

The prime object of the invention resides in the provision of a windshield wiper blade having in combination therewith a cleaning element so as to prevent the formation of sleet and ice on the windshield during the cold weather.

Another very important object of the invention resides in the provision of a windshield wiper blade in combination with a heating element of this nature whereby the combined structure is exceedingly simple, compact, and inexpensive to manufacture.

A further important object of the invention resides in the provision of a windshield wiper blade of this nature wherein the heating element is mounted thereon in a manner to operate thoroughly, efficiently and reliably.

With the above and numerous other objects in view as will appear as the description proceeds, the invention resides in certain novel features of construction, and in the combination and arrangement of parts as will be hereinafter more fully described and claimed.

In the drawing:

Figure 1 is an elevation of the blade embodying the features of my invention,

Figure 2 is another elevation thereof showing the opposite sides from that shown in Figure 1, a portion of the heating element in section, Figure 3 is a cross section through the blade showing a portion of the windshield, the cross-section through the blade being substantially on the line 3—3 of Figure 1.

Referring to the drawing in detail, it will be seen that the blade illustrated herein is conventional or may be of any other preferred construction. In its present embodiment it consists of a frame member F bent over upon itself along its median longitudinal dimensions to provide a pair of sides between which are received a portion of a squeegee S said squeegee being formed of a sheet of rubber or rubber like material. The heating element is denoted generally by the letter H and is of the electrical type. This heating element H comprises a core 5 of insulating material and of elongated construction extending full length of the blade. This insulating core 5 is surrounded by a resistance coil 6 which is placed in an electric current through suitable terminals 7 mounted on the frame F. A cylindrical shell 8 preferably of sheet metal surrounds the resistance coil 6 and the core 5 and is fixed inside of a deflecting shield 9 made of electrical and insulating material such as asbestos or an asbestos composition. This shield is substantially U-shaped in cross section or end elevation as is apparent from an inspection of Figure 3. One side of the shield 9 is fixed in any suitable manner to one side of the frame F so that the opening of the shield faces the windshield indicated at 10 in the drawing and thus causing the heat to be deflected onto the windshield and thus preventing the formation of ice and sleet on the outside of the windshield as so frequently happens during cold weather.

From the above detailed description it will be seen that the blade including the heating element H is light in its construction and has the parts secured together in a compact manner. The present embodiment of the invention has been disclosed in detail because in actual practice it attains the features of advantage enumerated as desirable in the statement of the invention and the above description, in a very efficient and reliable manner. This disclosure of the invention, however, has been made with the realization that numerous changes in the details of construction, and in the combination and arrangement of parts may be resorted to without departing from the spirit or scope of the invention as hereinafter claimed or sacrificing any of its advantages.

Having thus described my invention, what I claim as new is:

In combination, a windshield wiper blade comprising a frame, a squeegee in the frame, an elongated heat insulating shield on the frame longitudinally thereof, said shield being U-shaped in cross section and having one side secured to the frame, a tube in said shield longitudinally thereof, a core with a resistance coil wound thereabout disposed in the tube and means for placing the resistance coil in an electric circuit.

In testimony whereof I affix my signature.

GLENN P. TREGO.